United States Patent [19]
Srivastava et al.

[11] Patent Number: 5,963,740
[45] Date of Patent: Oct. 5, 1999

[54] SYSTEM FOR MONITORING COMPUTER SYSTEM PERFORMANCE

[75] Inventors: Amitabh Srivastava, Redmond, Wash.; Robert Alan Eustace, Redwood City, Calif.

[73] Assignee: Digital Equipment Corporation, Maynard, Mass.

[21] Appl. No.: 08/975,961

[22] Filed: Nov. 21, 1997

Related U.S. Application Data

[62] Division of application No. 08/778,648, Jan. 3, 1997, Pat. No. 5,732,273, which is a continuation of application No. 08/514,020, Aug. 11, 1995, abandoned, which is a continuation-in-part of application No. 08/204,834, Mar. 1, 1994, Pat. No. 5,539,907.

[51] Int. Cl.[6] ........................................... G06F 11/34
[52] U.S. Cl. ................................................ 395/704
[58] Field of Search ................... 395/707, 705, 395/704

[56] References Cited

U.S. PATENT DOCUMENTS 5,313,614  5/1994  Goettelmann et al. ............. 395/705
5,551,015  8/1996  Goettelmann et al. ............. 395/707

*Primary Examiner*—Tariq R. Hafiz
*Assistant Examiner*—John Q. Chavis
*Attorney, Agent, or Firm*—Pennie & Edmonds, LLP

[57] ABSTRACT

A program for monitoring computer system performance includes a collection of source code modules in the form of a high level language. Each of the source code modules is compiled into a corresponding object code module. The object code modules are assembled into machine dependent code. The machine code is translated into a program module in the form of a machine independent register translation language. The program module is partitioned into basic program components. The basic program components include procedures, basic blocks within procedures, and instructions within basic blocks. Fundamental instrumentation routines identify, locate, and modify specific program components to be monitored. The modified basic program components are converted to an instrumented machine executable code to be executed in the computer system so that performance data can be collected while the program is executing in the computer.

15 Claims, 8 Drawing Sheets

SYSTEM FOR MONITORING COMPUTER SYSTEM PERFORMANCE

This is a divisional of application Ser. No. 08/778,648, filed on Jan. 3, 1997, now U.S. Pat. No. 5,732,273, which is a continuation of application Ser. No. 08/514,020, filed Aug. 11, 1995, now abandoned, which is a continuation-in-part of application Ser. No. 08/204,834, filed on Mar. 1, 1994 now U.S. Pat. No. 5,539,907.

FIELD OF THE INVENTION

The present invention relates generally to computer systems, and more particularly to a method and apparatus for monitoring the performance of computer systems by instrumenting programs.

BACKGROUND OF THE INVENTION

Systems for monitoring computer system performance are extremely important to hardware and software engineers. Hardware engineers need systems to determine how new computer hardware architectures perform with existing operating systems and application programs. Specific designs of hardware structures, such as memory and cache, can have drastically different, and sometimes unpredictable utilizations for the same set of programs. It is important that any flaws in the hardware architecture be identified before the hardware design is finalized.

Software engineers need to identify critical portions of programs. For example, compiler writers would like to find out how the compiler schedules instructions for execution, or how well the execution of conditional branches are predicted to provide input for code optimization.

It is a problem to accurately monitor hardware and software systems performance. Known systems typically are hand crafted. Costly hardware and software modifications may need to be implemented to ensure that system operations are not affected by the monitoring systems.

Many monitoring systems are known for different hardware and software environments. One class of systems simply counts the number of times each basic block of machine executable instructions is executed. A basic block is a group of instructions where all the instructions of the group are executed if the first instruction of the group is executed. The counts can be studied to identify critical portions of the program.

Monitoring references to instructions and data addresses are usually performed by tracing systems. Data address traces can be used to improve the design of caches, and increase the efficiency of in-memory data structures. Instruction address traces can identify unanticipated execution paths.

In another class of systems, the simulated operation of the computer system is monitored. Simulators attempt to mimic the behavior of computer systems without actually executing software in real time.

There are problems with traditional monitoring systems. Most systems monitor a limited number of specific system characteristics, for example, executed instructions or referenced data. It is difficult for users to modify such systems for other purposes. Building specialized systems is not a viable solution since the number of system characteristics to be monitored is large and variable. If the performance data supplied by the monitoring system is less than what is desired the system is of limited use. If the system supplies too much performance data, the system is inefficient.

Most monitoring systems which count basic blocks accumulate counts for all the blocks of the program. Other than by tedious modifications, it usually is not possible to monitor selected blocks of interest.

Most known tracing systems gather detailed address data inefficiently. A typical trace for a small program can include gigabytes of trace data. A user interested in monitoring just the branch behavior of a program has to sift through entire traces just to find, for example, conditional branch instructions.

Simulating the execution of programs at the instruction level can consume enormous quantities of system resources. In addition, it is extremely difficult to accurately simulate the hardware and software behavior of a complex computer system. Simulated performance data does not always reliably reflect real run-time performance.

There also are problems with the means used to communicate performance data. Most systems use expensive inter-processor data communications channels to communicate performance data. Inter-processor communication channels are generally inefficient and may disturb the processing environment being monitored. Some systems make difficult modifications to the operating system to improve the efficiency of monitoring computer systems. Furthermore, unfiltered performance data can consume large quantities of disk storage space.

There is a need for a flexible and efficient monitoring system which can easily be adapted to a diverse set of monitoring tasks, ranging from basic block counting to measuring cache utilization. The information data should be precise, and reflect the actual operation of the computer system.

SUMMARY OF THE INVENTION

The invention avoids the above and other problems of known performance monitoring systems and methods, and satisfies the foregoing described needs. In accordance with the invention, a system for monitoring the performance of a computer system, while executing a program, instruments the machine dependent executable code prior to execution. The instrumentation places user analysis routines in the executable code. The user analysis routines are used to collect performance data while the program is executing.

The machine executable code can be created as a collection of source code modules in the form of a high level language by an editor. Each of the source code modules is compiled into a corresponding object code module. The object code modules are linked and assembled into machine dependent executable code. The machine dependent executable code is translated into an intermediate program module in the form of a machine independent register translation language (RTL). All addresses referenced in the RTL intermediate program module are maintained in a logical symbol table.

The program module is organized and partitioned into basic program components. The basic program components include procedures, basic blocks within procedures, and instructions within basic blocks. Procedures include instructions which are related for execution, instructions within each procedure are grouped into basic blocks. A basic block is a group of instructions where all of the instructions of the group are executed if the first instruction of the group is executed.

Fundamental instrumentation routines are provided to identify and locate specific program components to be monitored during execution, the identified specific program components are instrumented to insert call instructions to user analysis routines. The user analysis routines are combined with the instrumented procedures. The procedures are converted to instrumented machine dependent executable code for execution.

DETAILED DESCRIPTION OF A PREFERRED EMBODIMENT

Figure 1:
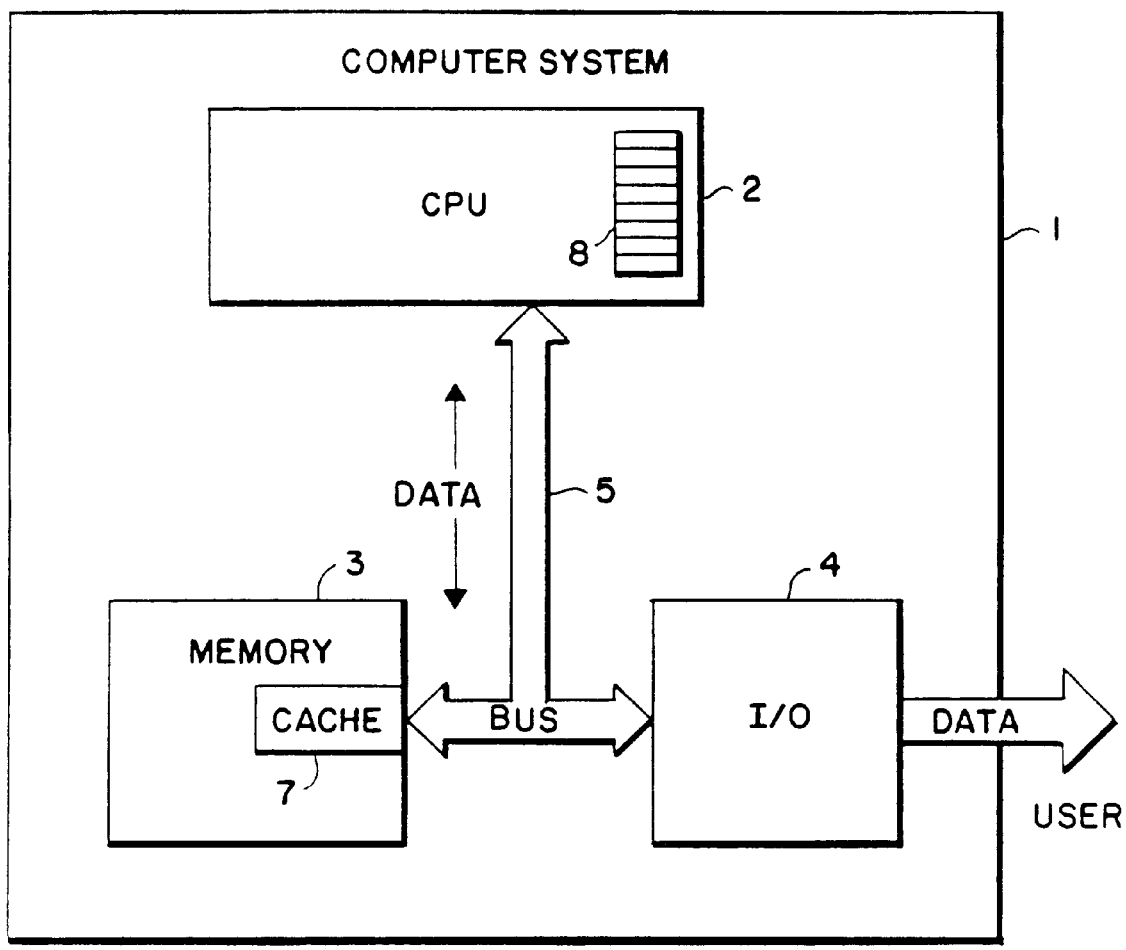
FIG. 1 is a block diagram of a computer system which can be monitored according to the principles of the invention.

FIG. 1 shows a computer system 1 to be monitored according to the principles of the invention. The computer system 1 includes a central processing unit (CPU) 2, a memory 3, and an I/O 4 coupled to each other by a communications bus 5. The computer system 1 can be a personal computer, a work-station, a main-frame, or part of a network of computers executing process steps independently, or in parallel.

With respect to the component structures of the computer system 1, the CPU 2 may be of a variety of architectures, such as complex or reduced instructions computing (CISC, RISC), and the like. The CPU 2 can include general purpose and dedicated registers 8. The registers 8 are for temporally storing data acquired from the memory 3.

The memory 3 can include a cache 7 to accelerate the data flow between the CPU 2 and the memory 3. The cache 7 can include specialized data and instruction caches. The structure of the bus 5 is general, and can include dedicated high-frequency data paths for communicating data, for example between the cache 7 and the CPU 2. The I/O 4 can include input and output interfaces for acquiring and distributing data.

During operation of the computer system 1, data and processing steps are acquired by the CPU 2, usually from the memory 3 or cache 7 via the bus 5. The processing steps are in the form of a sequence of machine executable code, e.g., instructions. The data and the machine executable instructions are usually permanently retained by the I/O 4, and loaded into the memory 3 as needed. The machine executable instructions process the data, and store the processed data back in the memory 3.

The machine executable instructions are tightly coupled to the architecture of the hardware components. The hardware architecture specifying word and byte sizes, bus widths and structures, instruction codes, register naming conventions, memory addressing schemes, input/output control, interrupt schemes, timing restrictions, and the like.

The machine executable instructions include operation codes (opcodes) and operand specifiers which are specifically encoded for the hardware that executes the instructions. The machine executable code is sometimes also known as the "binary image" of the program. In essence, the CPU 2 executes the machine executable code or binary image as is, without any further processing. In other words, the machine executable code, is the expressing of the source program that directly manipulates the hardware to perform the program process steps.

It is desirable to monitor the performance of the computer system 1 while it is operating. Performance data can be used to optimize the design of the hardware and software components of the system. Accurate performance data depends on monitoring the computer system 1 without substantially disturbing the processing environment.

For the purpose of monitoring, programs to execute in the computer system 1 can be viewed as a linear collection of procedures, the procedures including basic blocks, and the basic blocks including instructions. For the purpose of this description, the program can exist in a number of different forms, including the source program code created by a user with an editor, object code generated by a compiler, linked code from a linker, machine executable code or a binary image generated by a code generator such as an assembler. The binary image can be directly processed by the CPU 2 of the computer system 1. In the preferred embodiment of the invention, a monitor modifies the binary code to produce instrumented machine executable code which can be used to monitor the performance of the computer system 1.

It is desirable to monitor the execution of the program at the procedure, basic block, and instruction level. For example, monitoring the execution of the first machine executable instruction of basic blocks yields block counts. Monitoring machine executable instructions which load and store data in the memory allows the user to study cache utilization. The efficiency of branch prediction can be estimated by monitoring conditional branch instructions at the end of basic blocks.

Figure 2:
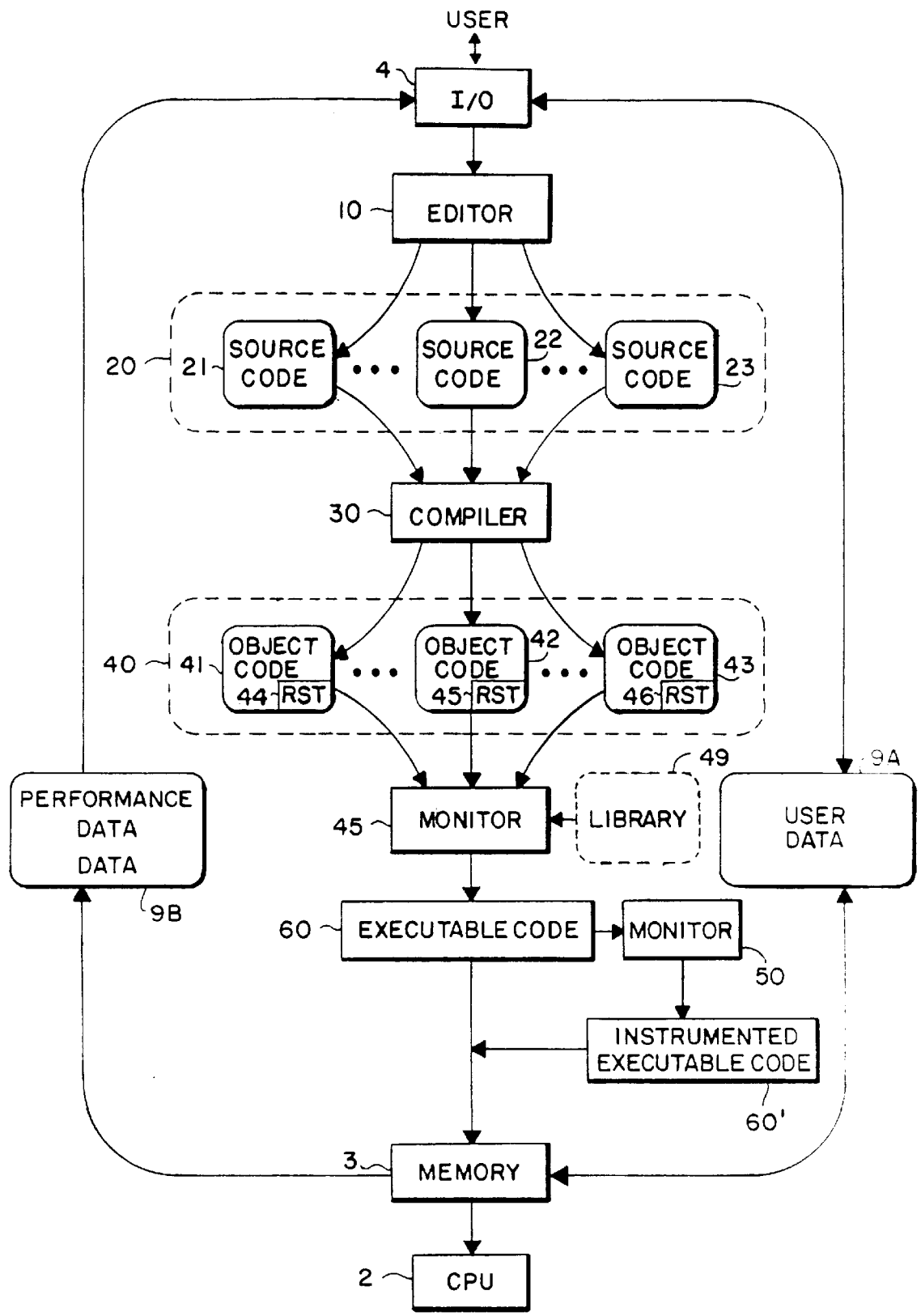
FIG. 2 is a top level flow diagram of a monitoring system.

FIG. 2 is an overview of a system which can be used for monitoring the performance of the computer system 1 of FIG. 1. Programmers or users, typically, via the I/O 4, define a process or program 20 in a high-level machine-independent language using an editor 10. The high-level language can be C, Cobol, Fortran, ADA, Pascal, and the like. If the program 20 is very large, the program 20 is created as a library or collection of smaller program segments, usually called source code modules 21–23.

A compiler 30 translates the high-level language of the program 20 to object code 40 stored in a collection of object modules 41–43. Usually, there is a one-to-one correspondence between the source modules 21–23 and the object modules 41–43. The object modules 41–43 are associated with corresponding relocation tables and symbol tables (RST) 44–46. The RSTs 44–46 are used to resolve logical addresses when the source program is converted to executable form. Frequently used portions of the program can be retrieved from a library of object modules.

A linker and/or assembler 45 can combine the object modules 41–43 into a machine dependent executable code 60. The linker 45 may include pre-compiled object code modules from a library of object modules 49. Typically, the machine executable code 60 is loaded into the memory 3 for execution by the CPU 2.

The machine dependent executable code 60 can be in the form of the Portable Executable (PE) file format as used in the Microsoft Corporation's Win 32 operating systems, such as Windows NT and Windows 95. The PE file format is organized as a linear stream of data including "MZ" headers, section bodies, and closing out with relocation information, symbol table information, and line number information.

The executable code 60 is stored in a file section. ".text". The data definitions for the text sections are stored in data sections, ".bss, .rdata, and .data". The .bss section represents uninitialized data. The .rdata section represents read-only data, such as literal strings, constants, and debugging information. All other variables, other than temporary variables created in a memory stack during execution, are stored in the .data section. Resource information is stored in a .rsrc section. For a more complete description of the PE file format please see *The Portable Executable File Format from Top to Bottom*, Randy Kath, Microsoft Corporation, 1993, and *Peering Inside the PE: A Tour of the Win 32 Portable Executable File Format*, Matt Pietrek, Microsoft Systems Journal, 1994.

Executable code 60 for other operating systems and hardware architectures have similar relocatable formats, see for example, OSF/1 *Alpha AXP Assembly Language Guide*, Digital Equipment Corporation, for OSF (Digital Unix) version 3.0, or higher. The interface for the relocations in the executable code is defined in a file "/usr/include/cmplrs/cmrlc.h."

In a preferred embodiment of the invention, a monitor 50 can be applied to the machine executable code 60 to identify specific portions of the program to be monitored for performance analysis while the program is executing in the CPU 2. Directions on which portions of the program to monitor can be supplied by the user of the computer system 1.

The monitor 50 can modify or "instrument" the machine dependent executable code 60 to enable the monitoring of the performance of the system 1. The modified code is converted to instrumented machine dependent executable code 60' which can be loaded in the memory 3 for subsequent execution by the CPU 2 of the computer system 1 of FIG. 1. While executing the instrumented program, the CPU 2 receives and provides user data 9A via the memory 3. The CPU 2 also generates performance data 9B stored in the memory 3, the performance data 9B can be retrieved via the I/O 4.

It is a goal of the invention to facilitate the identification of portions of the program to be monitored, and to modify the program in such a way that the performance characteristics of the computer system 1 are not disturbed. As an advantage of the invention, the computer system that executes the unstrumented code can have a different hardware architecture than the target system for which the uninstrumented code was generated.

Figure 3:
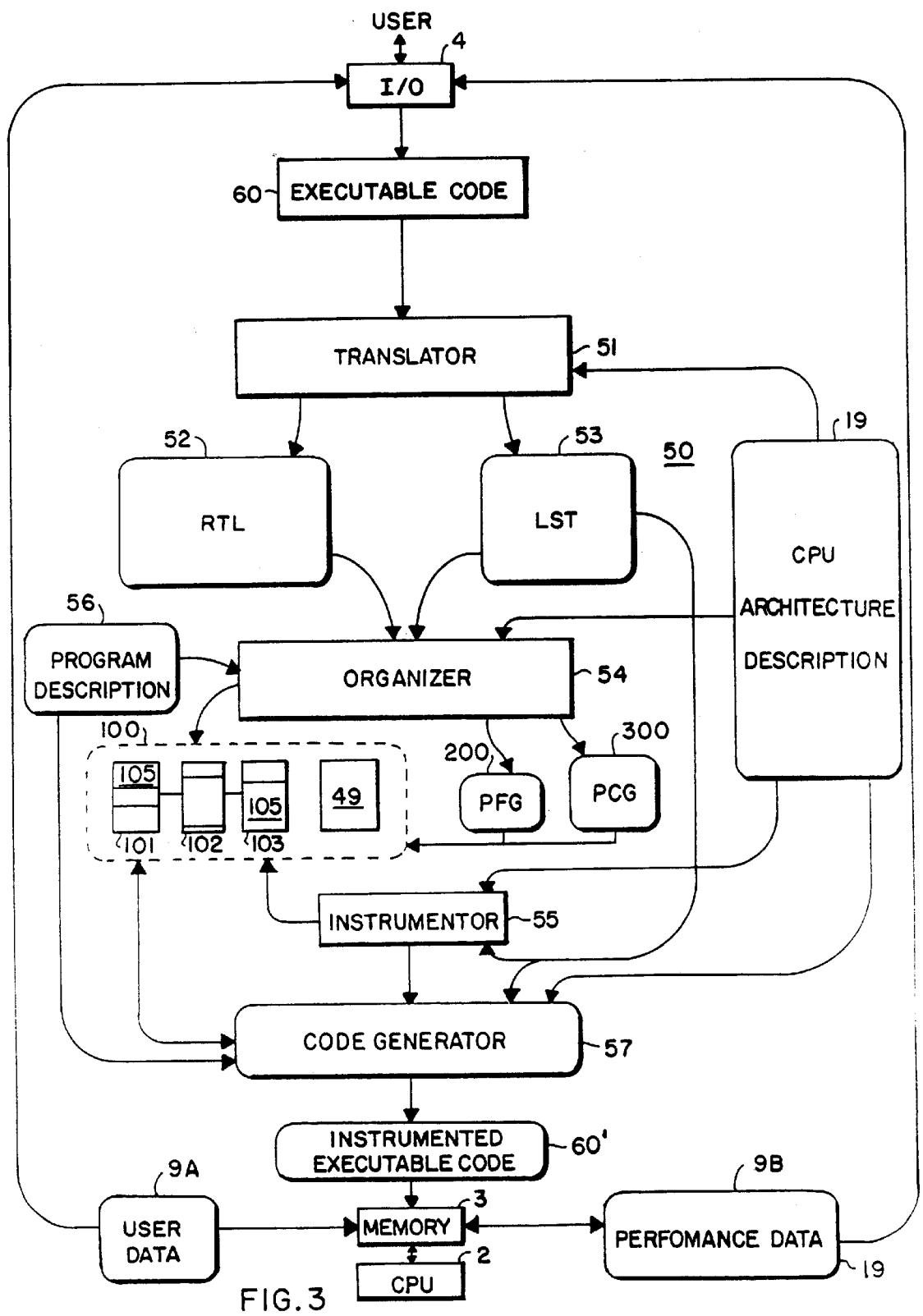
FIG. 3 is a detailed flow diagram of the monitoring system.

FIG. 3 is a flow diagram of the monitoring system according to the preferred embodiment of the invention. The monitor 50 includes a translator 51, an organizer 54, an instrumentor 55, and a code generator 57.

In the preferred embodiment of the invention, the monitor 50 operates on the machine dependent executable code 60 to produce instrumented machine dependent executable code 60'. In addition, as an advantage of the invention, the instrumented machine dependent executable code can be executed on a computer system that has a different hardware architecture than the system which is to executed the uninstrumented code 60. For example, the uninstrumented machine code 60 could be generated to execute in an Intel '486 CISC type of processor. The instrumented code 60' derived from the code 60 can be targeted for a high performance RISC machine, such as a 64-bit Alpha computer system, or vise versa.

The translator 51 transforms the machine dependent code 60 into an intermediate program module 52 in the form into a register translation language (RTL). The RTL is independent of any one particular computer systems or hardware architecture. The specific architectures of any number of different target computer systems can be maintained in a CPU architectures description 19.

This description 19 can be used to "parse" or disassemble the machine code 60. The CPU architecture description 19 may include instruction operand and operator field specifications, instruction timings such as fetch latencies and pile-line delays of different architectures. The CPU architecture description 19 can also describe cache, memory, and register characteristics, including addressing schemes for different classes of processors. The CPU architecture description 19 can also be subsequently used to generate the instrumented machine dependent executable code 60', perhaps for a different "output" target architecture than was intended for the uninstrumented machine code 60.

The translator 51 also transforms all machine code operand addresses into symbolic addresses. The relocation tables and the symbol tables 44–46 are likewise transformed into a logical symbol table (LST) 53. The RTL program module 52, the LST 53, and the CPU architecture description 19 can be stored in the memory 3. Translating the machine code 60 into an intermediate form expedites the identification of portions of the program to be monitored, and also allows aggressive modification of the program 20 for monitoring purposes.

The organizer 54 partitions the RTL intermediate program module 52 into a collection of procedures 100. Each of the procedures 101–103 includes instructions which are generally related for execution. Furthermore, the procedures 101–103 are organized into basic blocks 105. A basic block 105 is a sequence of instructions which are all executed if the first instruction of the sequence is executed. The instructions are a machine independent translation of the machine dependent operation codes and operands of the machine executable code 60.

The organizer 54 also builds a procedure flow graph (PFG) 200 and a program call graph (PCG) 300 in the memory 3. The PFG 200 maps the flow of control through the basic blocks 105 of the procedures 101–103. The PCG 300 indicates how the procedures 101–103 are called by each other. The monitor 50 can use the graphs 200 and 300 to trace the execution flow through the program while the organized procedures 100 are examined.

The instrumentor 55, under the direction of the user, identifies and modifies specific portions of the procedures 100 to be monitored. The process of identifying and modifying portions of the procedures 100 for the purpose of performance monitoring is sometimes known as "instrumentation" or "instrumenting the code." The instrumentor 55 is described in further detail below, with reference to FIG. 4.

The code generator 57 generates instrumented machine dependent machine executable code 60' for a target hardware architecture. As stated above, as an advantage of the invention, the target hardware for the instrumented machine code 60' can have a different architecture than the uninstrumented code 60.

Now for a more detailed description of the monitoring system according to the preferred embodiment of the invention.

The translator 51 converts the executable code 60 into the intermediate program module 52. The intermediate representation of the program is in the form of the register translation language and the logical symbol table 53. The RTL may be machine-independent, in the preferred embodiment of the invention, the RTL has been oriented for reduced instruction set computing (RISC) architectures.

The instructions of the RTL include generic operands such as load, store, jump, branch, and "operate." Only the load and store operands reference data in the memory 3. Procedure calls in the RTL are simple transfer of control instructions, for example "jump." Any parameters passed upon transfer of control are explicitly exposed. Conditional and unconditional transfer of control is accomplished with branch type of instructions.

All arithmetic and logical instructions "operate" on data stored in the registers 8. Unlike traditional machine code, the RTL assumes an expandable or infinite set of "virtual" registers, with some of the registers possibly having dedicated functions, for example, floating point arithmetic, a stack-pointer (SP) and a program counter (PC).

All address references in the RTL program module 52 are symbolic. For example, addresses expressed relative to the PC are converted to targets which are labels in the logical symbol table 53. Similarly, all references, direct or displaced, to data stored in the memory 3 are converted to symbolic memory references. Converting all addresses to symbolic form has the advantage of enabling unconstrained modification of the instructions of the RTL program module 52 to enable performance monitoring.

The organizer 54 partitions the module 52 into portions which can be monitored. First, the module 52 is partitioned into the collection of procedures 100. Instructions in each of the procedures 101–103 are further grouped into basic blocks 105. Basic blocks 105 can be classified as either "normal" blocks or "control" blocks. A normal block merely manipulates data, control blocks do not manipulate data, they alter the flow of execution. The basic blocks 105 facilitate the tracing of the execution flow.

The procedure flow graph 200 is built for each procedure, and the complete program call graph 300 is built for the entire program. These execution control structures are used during the subsequent instrumentation of the program.

Organizing the RTL module 52 enables the annotation of the module 52 in a program description 56. The program description 56 can be stored in the memory 3. The program description 56 facilitates the manipulation of the procedures 100 and also eases the identification of the fundamental organizational portions of the program by subsequent processing steps. The program description 56 can be incorporated into the RTL module 52 as, for example, comment fields.

The original structure of the source-level program 20 is recovered from the machine executable code 60 so that the monitor 50 can have as much knowledge of the program organization and control flow of the program as the compiler 30 did. For example, a source-level case-statement is compiled and assembled into machine code 60 as an indirect jump to an address from some location in a jump table index by the case index value. The jump table for case-statements is usually stored in a read-only data area with the addresses of different jump target location stored in successive locations. This makes it possible to recognize case-statements in the machine code 60. The address of the jump table can be obtained by examining the case-statement object code.

By identifying all of the case-statements in a program, the jump table can be partitioned into a set of branch tables of a known size. This in turn reveals all possible execution destinations. The execution destinations can be used to create the control graphs 200 and 300.

The structure and operation of the instrumentor 55 is now described in greater detail with reference to FIG. 4. Instrumentation of the program is a static process, e.g., the program is not executing. Under the user's direction, portions of the procedures 100 to be monitored are identified by "navigating" through the procedures using the program and CPU description 56 and 19, and the graphs 200, 300. In the monitoring system according to the preferred embodiment of the invention, a number of fundamental procedures or routines are provided to navigate through the program. The instrumentor 55 also includes standard routines for modifying the program, for monitoring purposes.

The instrumentor 55 has as input the program to be instrumented in the form of the organized procedures 100. The instrumentor 55 also uses the LST 53, the program description 56, the PFG 200, the PCG 300, and the CPU description 19. The instrumentor 55 also uses fundamental instrumentation routines (FIR) 47, user instrumentation routines (UIR) 48, and user analyzer routines (UAR) 49.

The FIR 47 are a set of basic procedures for identifying and modifying programs to be monitored. The user supplied UIR 48, in cooperation with the FIR 47 locate and modify specific portions of the program. The program is modified, in part, by inserting calls to the user analysis routines 49. The user supplied UAR 49 are procedures for collecting and analyzing performance data.

The fundamental instrumentation routines (FIR) 47 can be incorporated as a standard component of the instrumentor 55 when it is created. For example, the FIR 47 can be written in a high-level source language such as C. The source modules for the FIR 47 can be compiled and linked with the source modules of the monitor 50 using standard programming techniques. The user analysis routines (UAR) 49 can also be written in a high-level source language. The UAR 49 can be part of the library of object modules 49 submitted to the monitor 50 along with the procedures 100 of the programs to be monitored.

The fundamental instrumentation routines 47 include navigational, operational, parsing, and modification routines (47a–47d). The navigational routines 47a are used to traverse the static program to deduce structural information and execution flow information. The operational routines 47b retrieve specific information about the organizational structured traversed by the navigational routines 47a. The parsing routines 47c are used to identify and parse identified instructions. The modification routines 47d change the program so that it may be monitored.

Table 1 lists the navigational routines 47a of the FIR 47.

TABLE 1

| Navigational Routines | | | |
|---|---|---|---|
| Procedure | Block | Instruction | Edge |
| GetFirstProc | GetFirstBlock | GetFirstInst | GetFirstSuccEdge |
| GetLastProc | GetLastBlock | GetLastInst | GetNextSuccEdge |
| GetNextProc | GetNextBlock | GetNextInst | GetFirstPredEdge |
| GetPrevProc | GetPrevBlock | GetPrevInst | GetNextPredEdge |
| GetBlockProc | GetInstBlock | | GetEdgeTo |
| | | | GetEdgeFrom |

GetFirstProc returns as an output a pointer to the first procedure of the program that will be executed at run-time. The user can call this fundamental instrumentation routine to initiate static navigation through the program with a call from one of the UIR 48. Similarly, a call to GetLastProc returns as an output the pointer to the last procedure of the program.

Given a procedure pointer, GetNextProc and GetPrevProc return pointers to the next and previous procedures, respectively, unless there are no more procedures to navigate, in which case a "null" is returned. The GetBlockProc receives as an input a pointer to a block, and returns as an output a pointer to a parent procedure. The parent procedure is the one including the block.

The navigational routines for block, and instruction perform similar functions at the block and instruction level. For example, GetInstBlock receives as an input a pointer to an instruction and returns as output a pointer to a parent block of the instruction. The procedures of the program, and the blocks of the procedure can be located by following the procedure flow graphs 200 and the program call graph 300.

Figure 5:
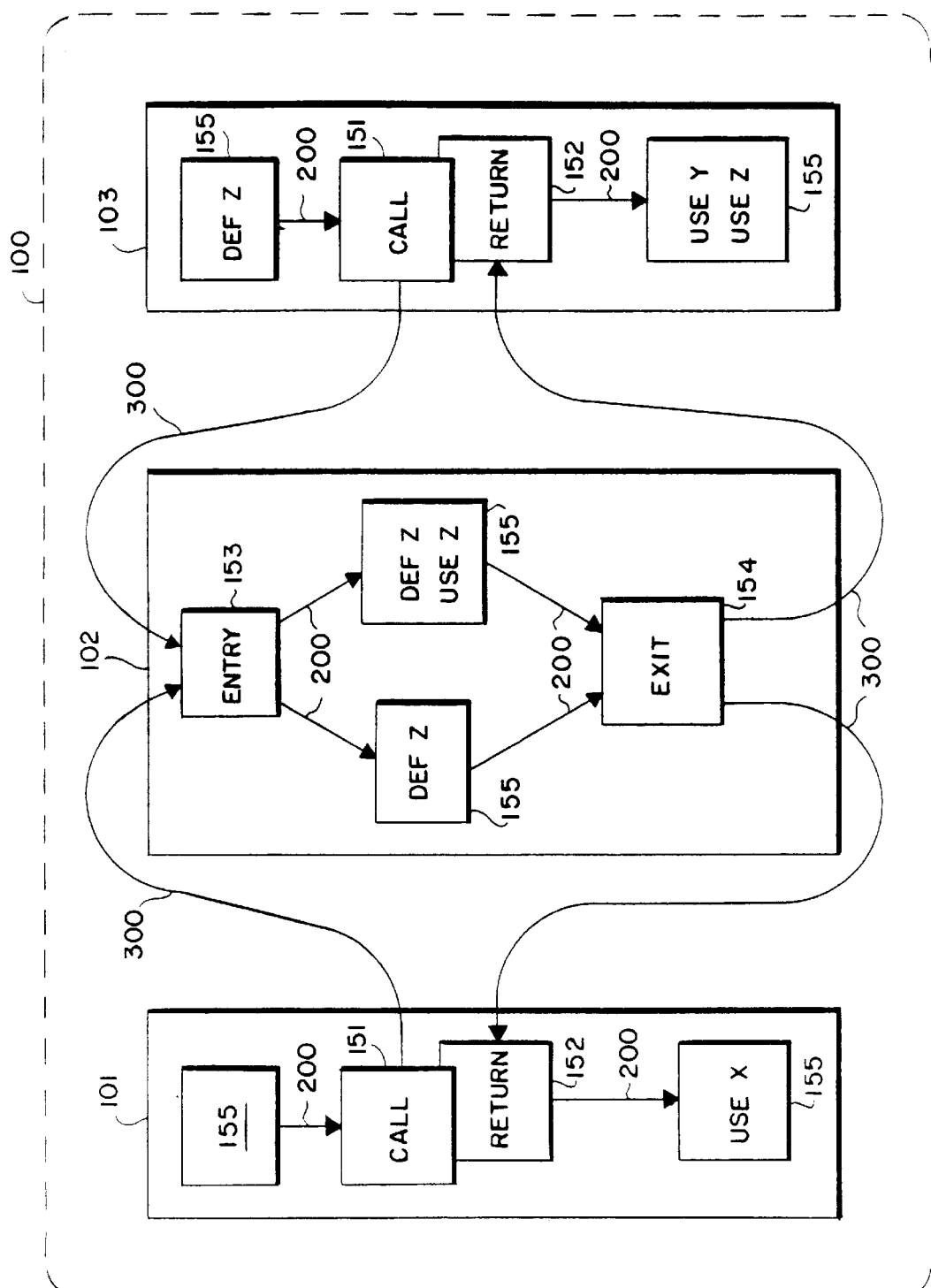
FIG. 5 is a flow diagram of a program showing calling edges.

The "edge" routines are described with reference to FIG. 5. FIG. 5 shows the procedure flow graph 200 and the program call graph 300 superimposed on the organized program 100. While executing, the interfaces or "edges" between the procedures 101–103 of the program are conjugate pairs of basic blocks, for example, call blocks 151 and return blocks 152. The call block 151 is the last block executed in a procedure before execution control is transferred to another procedure. Upon return, the return block 152 is executed first.

Each call block 151 has a single successor entry block 151 in the called procedure. The entry block is executed first when a procedure is called by another procedure of the program. Each return block 152 has a single predecessor exit block 154. The exit block 154 is the last block executed before execution control is transferred to the calling procedure. An entry block may have many predecessor blocks, likewise for successors of the exit blocks 154. The normal blocks 155 are not involved in the interprocedural transfer of execution control, the normal blocks 155 define, use and consume variables and registers, for example variables x, y, and z. Following the "edges" of the program enables the tracing of the execution flow while the program is static.

GetFirstSuccEdge and GetNextSuccEdge can be used to follow all possible execution paths from a specified block. Tracing the predecessor edges using GetFirstPredEdge and GetNextPredEdge locates all the possible execution paths that lead to the first instruction of the specified basic block. GetEdgeTo and GetEdgeFrom can be used to trace the execution of the program from edge to edge.

Figure 4:
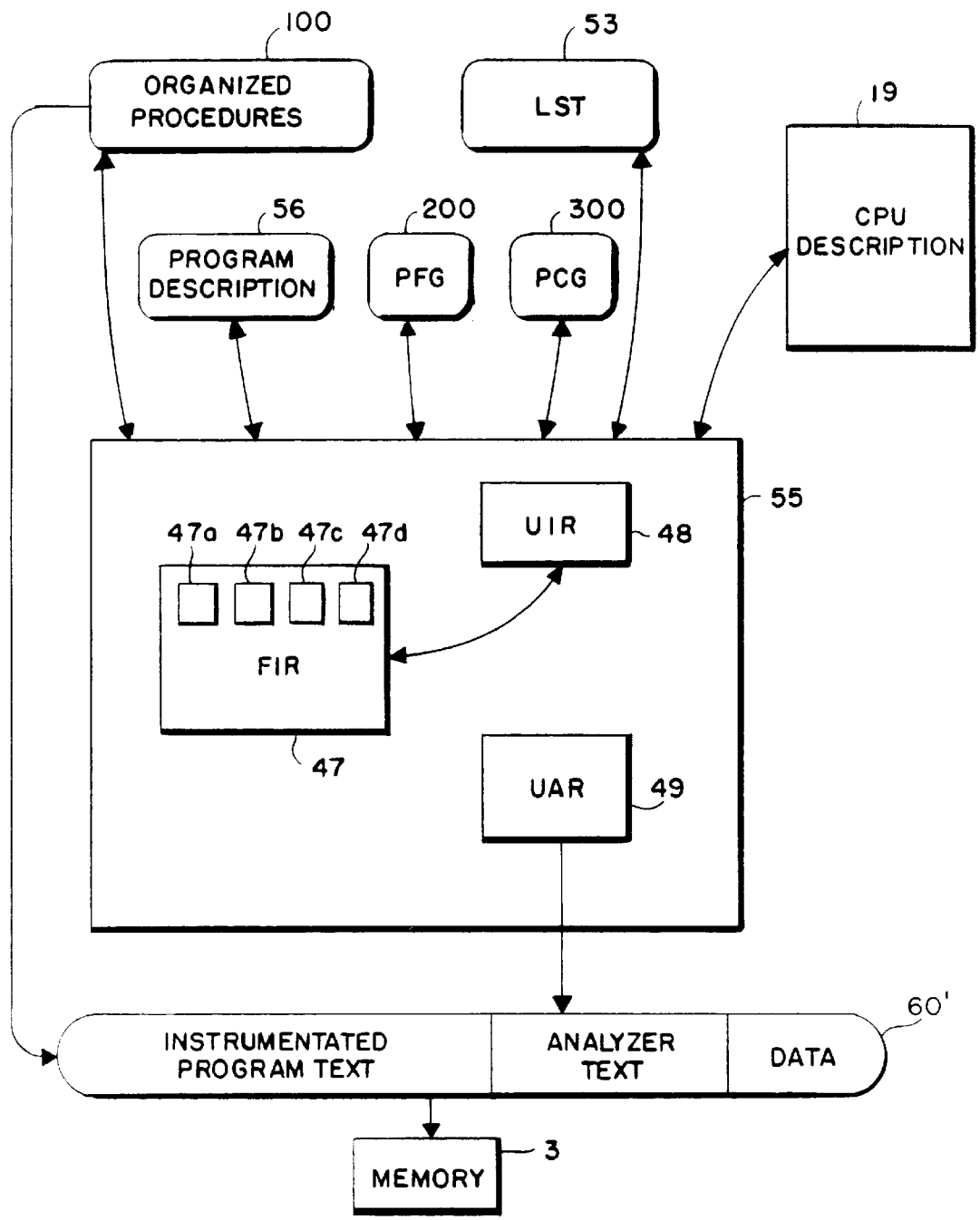
FIG. 4 is a flow diagram of routines for instrumenting a program.

Now continuing with description of the instrument or 55 of FIG. 4, the user instrumentation routines (UIR) 48 are constructed by including calls to the fundamental instrumentation routines 47 to find specific organizational structure of the program and to trace the execution flow. For example, the user can locate the last instruction of every procedure, the first instruction of every block, and only instructions which call other procedures, to give but a few examples.

The operational routines 47b are listed in Table 2. The operational routines provide information about portions of the program traversed by the navigational routines 47a.

TABLE 2

Operational Routines

| Program | Procedure | Block |
|---|---|---|
| GetProgramInfo | GetProcName | |
| GetProgramInstArray | GetFileName | |
| GetProgramInstCount | GetProcPC | GetBlockPC |
| GetProgramName | GetNamedProcedure | |

GetProgramInfo returns static information about the program such as the starting memory address of the program, and the size of the memory space used by the program while executing. Storage space is required for the instructions or "text" of the program and for data manipulated by the program. Memory storage allocation will be described in greater detail with reference to FIGS. 7 and 8.

GetProgramInstArray returns a pointer to an identified set of instructions of the program. The identified instructions can be passed to the user analyzer routine 49 for collateral manipulation during execution.

For example, the user analyzer routines 49 may want to collect dynamic address information from the instructions while the program is executing.

GetProgramInstCount returns the number of the instructions in the set identified by the GetProgramInstArray routine.

GetProgramName returns the name of the program. GetNameProc receives as input a procedure name, and returns the pointer to the named procedure.

GetProcName takes as an input a pointer to a procedure and returns as an output the name of the procedure. GetFileName, given the pointer to the procedure, returns the name of the file that is used to store the procedure. GetProcPC returns the run-time memory address of the procedure. GetNamedProc, given a procedure, name returns the pointer to the procedure. A null is returned if the named procedure does not occur in the program. GetBlockPC given a pointer to a block returns the memory address (PC) of the first instructions of the block.

Table 3 lists the parsing routines 47c which can be used to identify and parse specific instructions.

TABLE 3

Parsing Routines

| Routine | Value Returned |
|---|---|
| IsInstType | instruction type |
| GetInstInfo | instruction information |
| GetInstRegEnum | register type |
| GetInstRegUsage | register usage |
| GetInstPC | instruction memory address |
| GetInstBinary | instruction binary code |
| GetInstClass | instruction classification |
| GetInstProcCalled | procedure called |

GetInstType will return a logical true condition if the specified instruction is of a particular type. Different types of instructions include load, store, jump, branch, multiply, divide, floating point, etc. This routine can be used to determine if an instruction references memory or a register, and if execution flow is conditionally or unconditionally changed by, for example, branch instructions.

GetInstInfo parses the instruction into fields such as: operation code (opcode) field, memory displacement field, branch displacement field, addressing mode field, register fields, and the like.

To determine which of the registers are referenced by an instruction, one can use the GetInstReg routine. GetInsReg takes as input an instruction and an instruction type, and returns the type of registers used in the instruction, for example, integer, double precision, floating point, specialized, e.g., PC, SP etc.

To determine the actual usage of registers the GetInstRegUsage routine is used. For a given instruction, GetInstRegUsage indicates which registers are simply read, and which registers are written.

GetInstPC returns the memory address or PC of the instruction.

GetInstProcCalled returns the name of the procedure directly called by the instruction, presuming the instruction is either a branch or jump type of instruction.

GetInstBinary receives as in input a PC and returns the binary coded instruction stored at that memory address. This routine can be used to retrieve, for example, all the instructions of the program.

GetInstClass returns the instruction class. The instruction classes define instructions for specific hardware architectures. The classes of instructions can be stored, for example, in the CPU description 19. Hardware specific classes can include integer and floating point load and stores, integer and floating point arithmetic, logical functions, e.g., AND, OR, XOR, shift functions, e.g., rotate, scale, etc.

Table 4 lists the fundamental instrumentation routines that are available for modifying the program so that performance data can be collected.

TABLE 4

Modification routines

AddCallProto
AddCallProgram
AddCallProc
AddCallBlock
AddCallInst
AddCallEdge

The program can be modified at a point before or after the identified portion so that during execution performance data can be collected before and after executing the identified portion. In the preferred embodiment of the invention, all communication between the modified program and the user analysis procedures 49 is by procedures calls. Procedure calls reduce processing time associated with the monitoring process. The identified portion can be the program, procedures, block, edge and instruction.

Any data stored in registers used by the user analysis routines 49 must remain unchanged to preserve the execution state of the modified program. The data can be saved in the stack before execution control is passed to the analysis procedures 49, and restored upon return.

The routine AddCallProto is used to define what performance data are to be passed to the analysis routines during execution. Typical data to be passed may include static data, such as opcode, or dynamic data, for example, register or memory contents. It is also possible to pass computed values such as effective memory address, and a conditional value. The effective memory address should only be used with instructions which reference memory, i.e., load and store. The computed value is the base memory address plus the sign extended relative displacement The condition value should only be used when instrumenting branch instructions. If the branch is not taken, the value passed is zero.

It is also possible to pass arrays to the analysis routines 49. The following sample user instrumentation routine, in the C language, creates a data structure that contains the program counters for each procedure, the data structure is passed as an argument to an "Open File" user analysis routine.

Sample User Instrumentation Routine int number
char prototype [100]
number = 0

-continued

Sample User Instrumentation Routine

```
for (proc = GetFirst Proc( ) proc != NULL, proc=GetNextProc(proc))
{
    number ++;
}
pcArray = (long*) malloc(size of(long)* number);
number = 0;
for (proc = GetFirstProc( ),proc != NULL, proc = GetNextProc(proc))
{
    pcArray [number++] = ProcPC(proc);
}
sprintf(prototype, "OpenFile(long[% d])",number);
AddCallProto(prototype);
AddCallProgram(ProgramBefore, "OpenFile",pcArray);
```

AddCallProgram takes as an argument the location or place where the program is to be modified, for example, the beginning or the end. AddCallProgram inserts a procedure call to an analysis routine at the specified location. During execution, the call causes transfer of control to the analysis routine so that performance data can be collected.

AddCallProc is similar at the procedure level. The semantics of modifying the program before and after procedures and basic blocks are maintained even if there are multiple entry points and multiple exit points. For example, if a procedure has multiple entry points, adding a call before the procedure will add the call for each entry point of the procedure, and will only call the analysis routine once, regardless of which entry point is selected during execution.

The UIR 48 in cooperation with the fundamental instrumentation routines are used to traverse the entire program. The UIR 48 can locate and identify specific portions of the program, e.g., procedures, blocks, and instructions, to be modified for monitoring.

The UIR 48 can be created by the user as a high-level source code module. The UIR 48 when compiled and linked with the FIR 47 adapts the instrumentor 55 to perform specific monitoring task.

Figure 6:
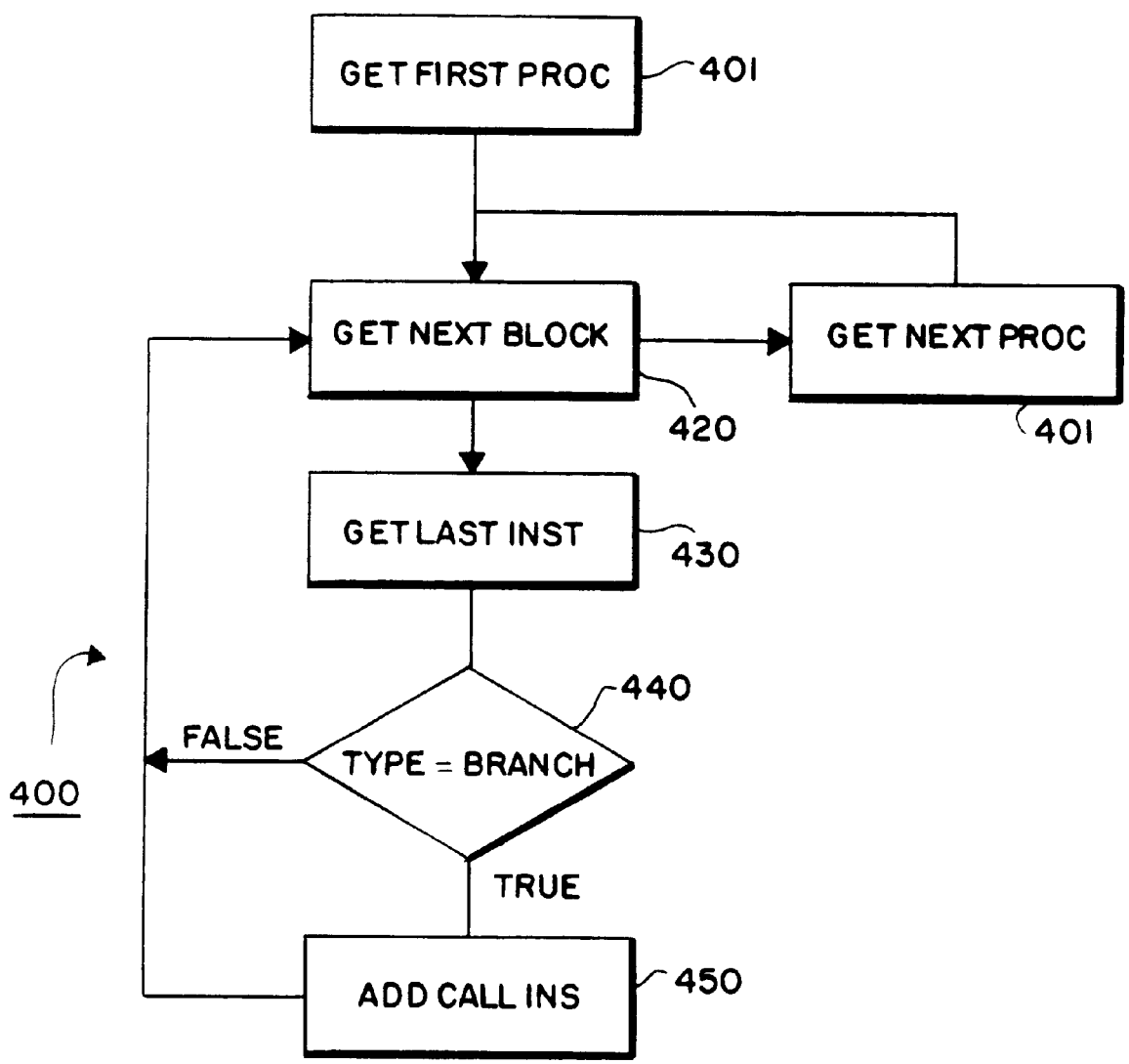
FIG. 6 is a flow diagram of an instrumentation procedure for branch analysis.

By way of example, FIG. 6 shows a user instrumentation routine BRANCH 400 for locating all conditional branch instructions in the program. The branch instructions are found by tracing the execution flow through the static program and identifying only instructions of the branch type. Thus located branch instructions can be modified so that the branch predication rate can be determined.

In steps 401 and 410 and, the procedures 101–103 of the program are located. Step 420 locates the blocks 105 of each procedure, and in step 430 the last instruction of each block is located. In step 440, a determination is made to see if the last instruction of the block is of the desired type, for example, conditional branch. If the instruction is of the desired type, the program is modified in step 450.

Following is a summary of some exemplary user instrumentation and analysis routines that can be used to monitor different operating characteristics of the program. These routines illustrate the adaptability of the monitoring system to collect and analyze different performance characteristics. For each monitoring opportunity there is an instrumentation and an analysis routine.

CACHE

The CACHE instrumentation and analysis routines can be used to simulate the execution of the program with, for example, an 8K direct mapped cache having 32 byte lines, and a read allocate policy. The instrumentation routine modifies the "load" and "store" type of instructions and passes the effective memory addresses referenced by these instructions to the analysis routine. Cache "hits" and "misses" are simulated upon a reference, and cache tags are updated to reflect the current state of the cache.

MALLOC

The MALLOC instrumentation routine modifies the program to collect statistics on dynamically allocated memory. The routine identifies the portions of the program which dynamically allocate memory and insert a call to the complementary analysis routine to create a histogram of dynamic memory allocations.

TRACE

In order to trace the starting address of each executed basic block and the effective address of each memory reference the TRACE routines can be used.

DYNINST

To dynamically count the number of times specific procedures, basic blocks, and instructions, e.g., load and store, are executed use the DYNINST routines.

BLOCK

The BLOCK routines count the number of times identified basic block of the program is executed.

PROFILE

The PROFILE instrumentation routine modifies the program to count the total number of instructions that are executed in each of the procedures and to compute the percentage of instructions executed. The PROFILE analysis routine collects these performance data and prints an execution profile of the program.

BRANCH

These routines enable the monitoring of branch prediction rate for each "branch" instruction. The analysis routine prints a histogram of the branch prediction rate for the entire program, see FIG. 6.

DTB

The data translation buffer routines can be used to monitor the efficiency of, for example, a 32 byte entry data translation buffer using a "not most recently used" replacement policy for 8K byte memory pages.

CLASSES

The CLASSES instrumentation routine statically counts the number of instructions in the program for each instruction class.

INLINE

These routines may be used to identify procedures of the program which may be placed in-line to improve execution performance. The output of the analysis routine includes procedure names, call addresses, and the number of times each procedure is called.

When the procedures 100 are fully instrumented, the user analysis routines 49 are added and linked in such a way that the execution of the program 20 is unaffected. In order to ensure accurate performance data, the analysis routines 49 are always presented with a program state representing the uninstrumented or "pure" version of the program The analysis routines 49 do not share any procedures or data with the program 20 being monitored. If both the program 20 and the analysis routines 49 require the same library procedure, for example, a procedure to print data, a copy of the required library procedure is incorporated in the program and a separate copy is incorporated in the analysis routines 49.

During execution of the instrumented program, the instrumented executable code 60' and the analysis routines share the same address space of the memory 3. The user data 9A of the program are not relocated so that the original data addresses can be maintained.

Figure 7:
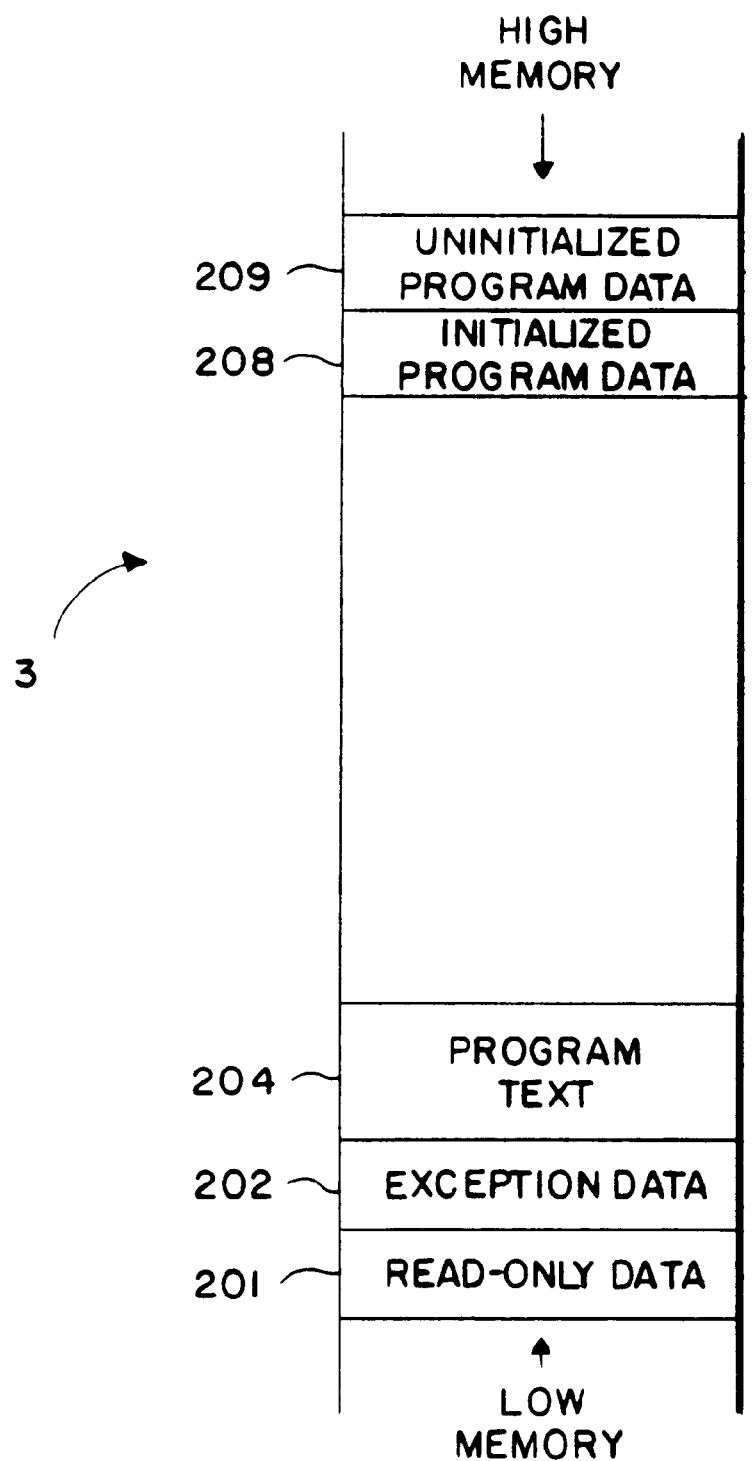
FIGS. 7 and 8 are block diagram of allocated memory for machine code before and after instrumentation.
Figure 8:
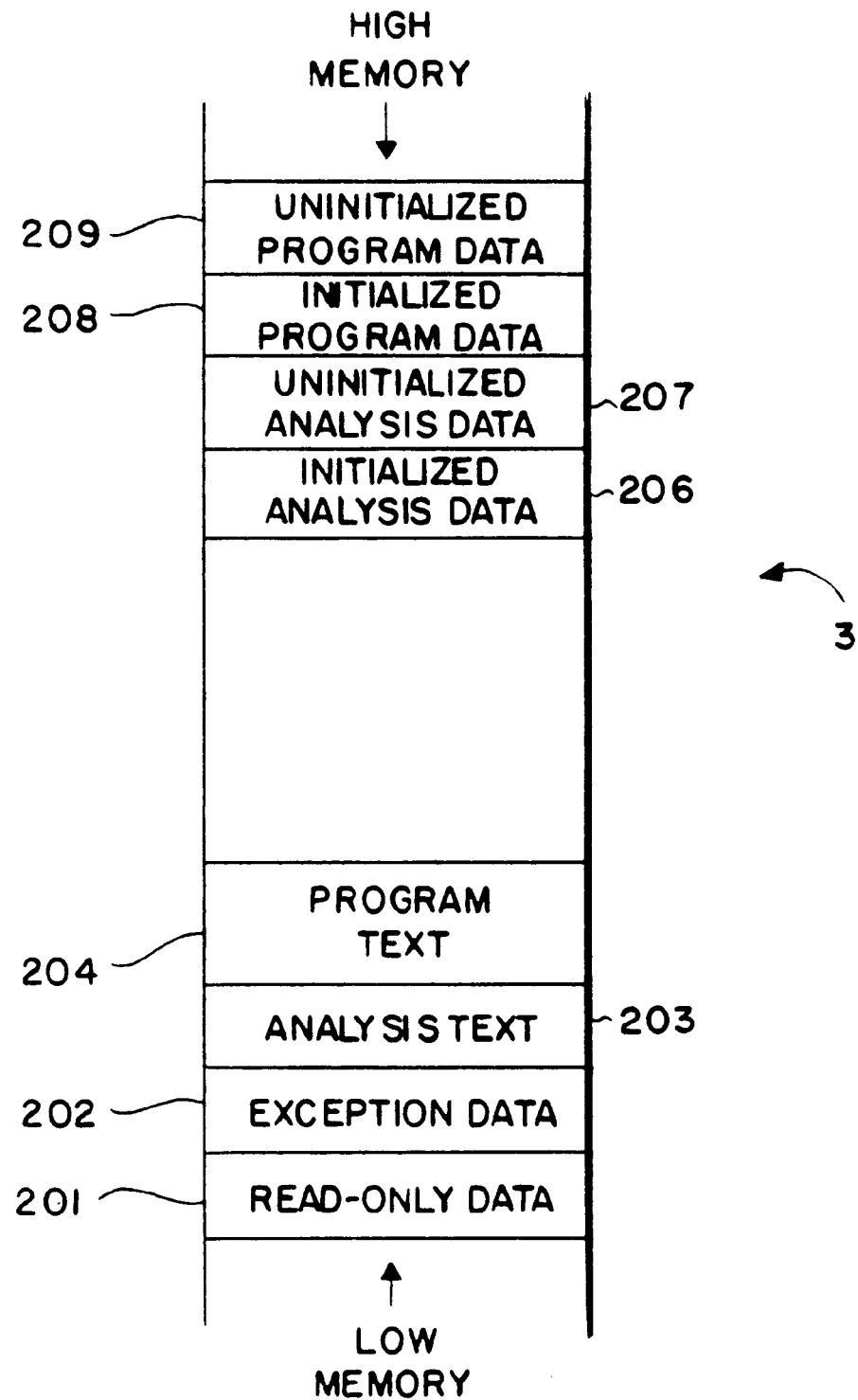

FIGS. 7 and 8 show the allocation of memory storage space for the program before and after instrumentation, respectively. Beginning at a low memory address are stored the read-only user data 201. The read-only data 201 are data which should not be modified during execution of the program. The read-only user data 201 are followed by the exception data 202. The exception data 202 are unanticipated data generated by the CPU 2 due to unanticipated exception conditions encountered while executing the program, for example, page fault, illegal operation, etc. In the instrumented code 60', the analysis text 203 which are the machine dependent executable instructions of the user analysis routines are inserted between the program text 204 and the exception data 202. The analysis text can be in the form of a .text file as described for the Microsoft Portable Executable (PE) file format described above.

Beginning at a high memory address, are the uninitialized and initialized user data 208 and 209. For the instrumented code 60', the uninitialized and initialized analysis data 207 and 206 follow the program data 209–208. The uninitialized analysis data are converted to initialized analysis data by setting all values to zero.

The instrumentation of the program by adding instructions, and the addition of the analysis routines 49 has caused the program addresses to be relocated. However, it is possible to statically map the relocated address of program to the unmodified addresses. For example, if the analysis routines 49 need the program counter (PC) of the program, the run-time PC can be mapped to the original PC of the uninstrumented code 60.

Now continuing with reference to FIG. 4, the code generator 57, using a hardware architecture selected from the CPU description 19, can produce machine dependent executable code 60' from the instrumented procedures 100.

The executable code 60' can be loaded into the memory 3 of a target hardware of choice for execution. During execution, the instrumented code will call the analysis routines. The analysis routines collect 9B which are stored in the memory 3. The data can be analyzed in real-time as the program is executing, or the data can be analyzed by the user after the program finishes execution.

In conclusion, the monitoring system as described herein provides a single framework for monitoring the performance characteristics of computer systems while executing programs. The system handles the details of program modification while the user concentrates on what performance data are to be collected, and how the performance data are to be analyzed. The performance data are communicated to the analysis routines by simple fast procedure calls, reducing the monitoring overhead.

The common structures of programs to be identified and modified can be performed by fundamental instrumentation procedures. The user supplies simple problem specific procedures for different monitoring tasks.

It will be apparent to those skilled in the art that various modifications can be made to the present invention without departing from the spirit and scope of the invention as set out in the appended claims.

We claim:

1. A computer implemented method for modifying a program, the program including first instructions to be executed in a computer system having a memory, comprising the steps of:

processing the program in a compiler;

translating the first instructions of the program received from the compiler into a program module of an intermediate language;

modifying the program module by including at least one additional instruction to transfer control to a user analysis routine to monitor performance in the program module, wherein the user analysis routine does not share procedures or data with the program module; and generating from the modified program module a modified program having second instructions.

2. The method of claim 1 further comprising the step of:

partitioning the program module into a plurality of basic components, the basic components including procedures of the program, and the procedures including basic blocks.

3. The method of claim 1 further comprising the step of:

constructing, in a memory of the computer system, a flow graph for each procedure and a program call graph, the procedure flow graphs indication the execution flow within each procedure, the program call graph to indicate the execution flow among the procedures.

4. The method of claim 3 further comprising the step of:

tracing an execution flow through the plurality of basic program components using the procedure flow graphs and the program call graph to identify a particular basic component to modify.

5. The method of claim 4 further comprising the step of:

wherein the additional instruction is a call instruction to the user analysis routine, the call instruction being executed when the specific program component is executed in the computer system.

6. The method of claim 1 further comprising the step of:

combining the user analysis routine with the modified program.

7. The method of claim 1 wherein a first hardware architecture is associated with the first machine dependent executable instructions, and a second hardware architecture is associated with the second machine executable instructions.

8. A computer implemented method for modifying a program module in the form of instructions of an intermediate machine readable language produced by a translator into machine dependent executable instructions to be carried out in a computer system comprising the steps of:

modifying the program module by partitioning the program module into basic program components, and including at least one additional instruction to transfer control to a user analysis routine to monitor performance in at least one of the basic program components, wherein the user analysis routine does not share procedures or data with the program module; and generating machine dependent executable instructions from the modified program module.

9. The method of claim 8 wherein the step of modifying the program module includes partitioning the program modules into the basic program components and tracing an execution flow through such program components to deduce structural and execution flow information.

10. The method of claim 9 wherein the step of tracing is accomplished using navigational routines.

11. The method of claim 9 wherein the step of modifying the program module further includes locating a program component to be monitored during tracing using the deduced structural information.

12. The method of claim 11 wherein the step of modifying the program module further includes inserting a call instruction in the located program to be monitored, the call instruction to transfer execution control to a user analysis routine to monitor the program component to be monitored during execution of such program component in the computer system.

13. A computer implemented method for modifying a program module produced by a translator in the form an intermediate machine readable language having instructions independent of computer hardware architecture into machine dependent executable instructions to be carried out in a computer system comprising:

partitioning the linked code module into basic program components;

tracing an execution flow through the basic program components using navigational routines to deduce structural and flow information;

locating program components to be monitored during the tracing step using the deduced structural information; and inserting a call instruction in the located program component to be monitored, the call instruction for transferring execution control to a user analysis routine to monitor the program component to be monitored during execution of the program component in the computer system, wherein the user analysis routine does not share procedures or data with the program module.

14. A method of modifying a computer program formed of machine dependent executable instructions, comprising the steps of:

translating the machine dependent executable instructions into a program module in an intermediate language;

partitioning the program module into a plurality of basic program components;

tracing an execution flow through the plurality of basic program components using navigational routines;

while tracing the execution flow through the plurality of basic program components, modifying the plurality of basic program components by inserting a call instruction to transfer execution control to a user analysis routine when a specific program component is executed in the computer system, wherein the user analysis routine does not share procedures or data with the program module; and generating instrumented machine dependent executable code from the modified plurality of basic program components after inserting the call instruction.

15. A method of modifying a computer program formed of machine dependent executable code, comprising the steps of:

translating the machine dependent executable code into machine independent executable code;

inserting a call instruction referencing a user analysis routine into the machine independent executable code, wherein the user analysis routine does not share procedures or data with the program module; and generating modified machine dependent executable code from the machine independent executable code which includes the call instruction.

* * * * *